(12) United States Patent
Wakimoto

(10) Patent No.: US 10,903,598 B2
(45) Date of Patent: *Jan. 26, 2021

(54) CONNECTOR

(71) Applicant: Sumitomo Wiring Systems, Ltd., Mie (JP)

(72) Inventor: Isao Wakimoto, Mie (JP)

(73) Assignee: Sumitomo Wiring Systems, Ltd.

(*) Notice: Subject to any disclaimer, the term of this patent is extended or adjusted under 35 U.S.C. 154(b) by 104 days.

This patent is subject to a terminal disclaimer.

(21) Appl. No.: 16/446,116

(22) Filed: Jun. 19, 2019

(65) Prior Publication Data

US 2019/0305473 A1    Oct. 3, 2019

Related U.S. Application Data

(63) Continuation of application No. 15/772,585, filed as application No. PCT/JP2016/080791 on Oct. 18, 2016, now Pat. No. 10,355,392.

(30) Foreign Application Priority Data

Nov. 6, 2015    (JP) .................................. 2015-218328

(51) Int. Cl.
*H01R 13/73*    (2006.01)
*H01R 13/52*    (2006.01)
(Continued)

(52) U.S. Cl.
CPC ......... *H01R 13/5202* (2013.01); *H01R 9/223* (2013.01); *H01R 13/46* (2013.01);
(Continued)

(58) Field of Classification Search
CPC .... H01R 13/73; H01R 13/5202; H01R 9/223; H01R 4/34; H01R 4/70; H01R 11/12; H01R 2107/00
(Continued)

(56) References Cited

U.S. PATENT DOCUMENTS 6,478,909 B1    11/2002    Tuttle
7,097,498 B2    8/2006    Miyazaki
(Continued)

FOREIGN PATENT DOCUMENTS

JP    09-63673    3/1997
JP    2006-31962    2/2006
(Continued)

OTHER PUBLICATIONS

International Search Report dated Dec. 13, 2019.

*Primary Examiner* — Abdullah A Riyami
*Assistant Examiner* — Vladimir Imas
(74) *Attorney, Agent, or Firm* — Gerald E. Hespos; Michael J. Porco; Matthew T. Hespos

(57) ABSTRACT

A connector (10) has a housing (20) including a body (21). A work hole (23) long in a lateral direction penetrates through the body (21). Terminals (30) are held in the housing (20) and are arranged side by side in the lateral direction in the work hole (23). Each terminal (30) includes an embedded portion (31) embedded in the housing (20), an internal (Continued)

connecting portion (32) connected to the embedded portion (31) and disposed inside the work hole (23) and an external connecting portion (33) connected to the internal connecting portion (32) and disposed outside the work hole (23). Protection walls (22) project from the body (21) at both sides of a terminals (30). Tip parts of the protection walls (22) are more distant from the body (21) than the external connecting portions (33) in a penetration direction of the work hole (23).

7 Claims, 4 Drawing Sheets

(51) Int. Cl.
| | | |
|---|---|---|
| | *H01R 13/46* | (2006.01) |
| | *H01R 9/22* | (2006.01) |
| | *H01R 11/12* | (2006.01) |
| | *H01R 107/00* | (2006.01) |
| | *H01R 4/70* | (2006.01) |
| | *H01R 4/34* | (2006.01) |

(52) U.S. Cl.
CPC ............... *H01R 13/73* (2013.01); *H01R 4/34* (2013.01); *H01R 4/70* (2013.01); *H01R 11/12* (2013.01); *H01R 2107/00* (2013.01)

(58) Field of Classification Search
USPC ........................................................ 439/559
See application file for complete search history.

(56) References Cited

U.S. PATENT DOCUMENTS

| | | |
|---|---|---|
| 7,597,595 B2 | 10/2009 | Ohashi |
| 7,850,480 B2 | 12/2010 | Takanashi |
| 7,934,950 B2 | 5/2011 | Yong |
| 8,167,634 B2 | 5/2012 | Fujiwara |
| 8,770,989 B2 | 7/2014 | Ohhashi |
| 9,537,252 B2 | 1/2017 | Matsuda |
| 9,698,517 B2 | 7/2017 | Kataoka |
| 9,917,400 B2 | 3/2018 | Chatelus |
| 9,997,974 B2 | 6/2018 | Ishibashi |
| 10,164,371 B2 | 12/2018 | Hara |
| 2009/0068894 A1 | 3/2009 | Ohashi et al. |
| 2015/0079839 A1 | 3/2015 | Takemura |

FOREIGN PATENT DOCUMENTS

| | | |
|---|---|---|
| JP | 2009-70653 | 4/2009 |
| JP | 3151308 | 5/2009 |
| JP | 2015-60681 | 3/2015 |
| JP | 2015-95355 | 5/2015 |

CONNECTOR

This application is a divisional of U.S. patent application Ser. No. 15/772,585, filed May 1, 2018.

BACKGROUND

Field of the Invention

This specification relates to a connector.

Description of the Related Art

Japanese Unexamined Patent Publication No. 2006-31962 discloses a wire-side connector to be connected to a terminal block. This wire-side connector includes a first connector to be mounted directly on a device. The first connector includes a first housing and first terminal fittings. A rear end part of the first terminal fitting projects rearward from the rear end surface of the first housing and is exposed to the outside of the first housing. Further, partition walls are provided on the rear end surface of the first housing for partitioning between adjacent first terminal fittings. However, if the above-described wire-side connector is dropped by mistake, the first terminal fittings may collide with a ground surface to be damaged. Specifically, although the partition walls are present on the sides of the adjacent first terminal fittings, there is no partition wall on opposite sides. Thus, if the wire-side connector is dropped with the side having no partition wall faced down, the first terminal fitting may collide with the ground surface.

SUMMARY

A connector disclosed by this specification includes a housing with a body. A work hole that is long in a lateral direction penetrates through the body, and terminals are held in the housing. The terminals are arranged side by side in the lateral direction in the work hole. Each terminal includes an embedded portion embedded in the housing, an internal connecting portion and an external connecting portion. The internal connecting portion is connected to the embedded portion and is disposed inside the work hole, while the external connecting portion is connected to the internal connecting portion and is disposed outside the work hole. The housing has two protection walls projecting from the body. The protection walls are disposed at both sides of a terminal group composed of the terminals in the lateral direction. Tips of the protection walls are disposed at positions more distant from the body than the external connecting portions in a penetration direction of the work hole.

According to this configuration, the protection walls collide with a ground surface earlier than the external connecting portions if the connector is dropped by mistake, thereby avoiding damage of the external connecting portions. Further, the protection walls are disposed at both sides of the external connecting portions in the lateral direction. Thus, the external connecting portions located on both sides in the lateral direction also can be protected by the protection walls.

The external connecting portion may be composed of a vertical portion connected to the internal connecting portion and a horizontal portion connected to the vertical portion. The protection wall may include a first protection wall disposed on one side in a longitudinal direction perpendicular to the lateral direction and a second protection wall disposed on the other side in the longitudinal direction. Thus, one side of the horizontal portion can be protected by the first protection wall and the other side of the horizontal portion can be protected by the second protection wall.

The protection walls may project from an edge of the work hole in the body in the penetration direction of the work hole. According to this configuration, the protection walls do not enlarge the connector.

Accordingly, the connector disclosed by this specification protects the terminals if the connector is dropped by mistake.

DETAILED DESCRIPTION

Figure 1:
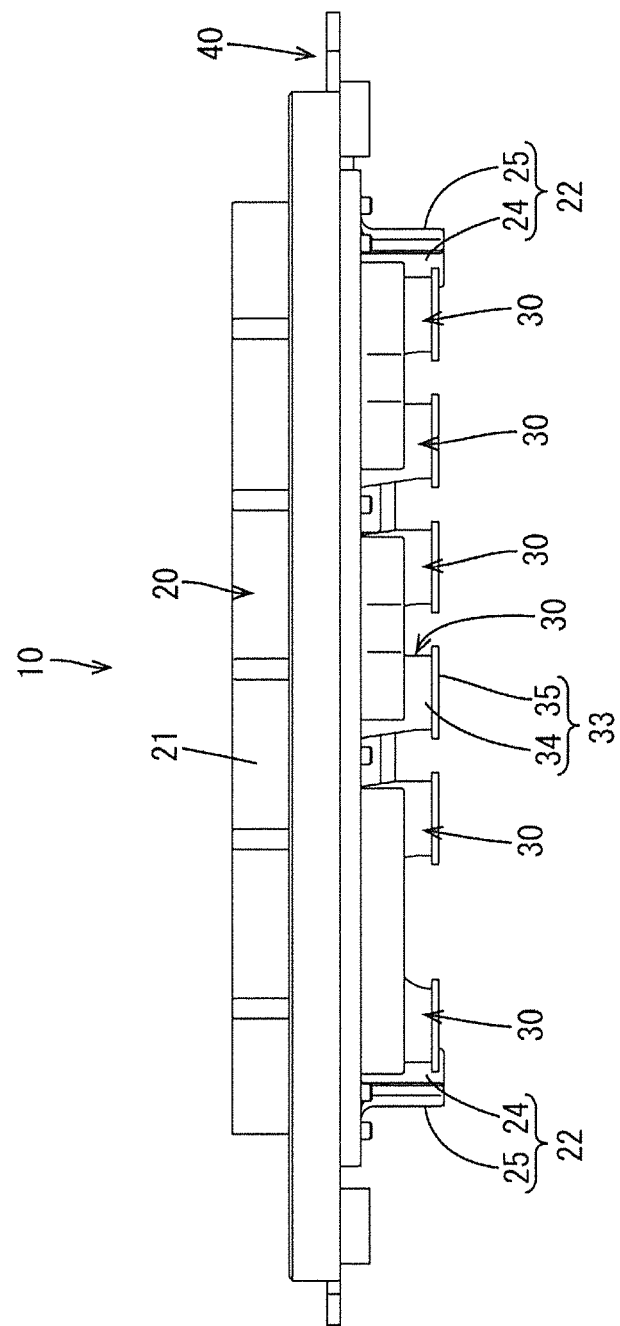
FIG. 1 is a front view of a connector.
Figure 2:
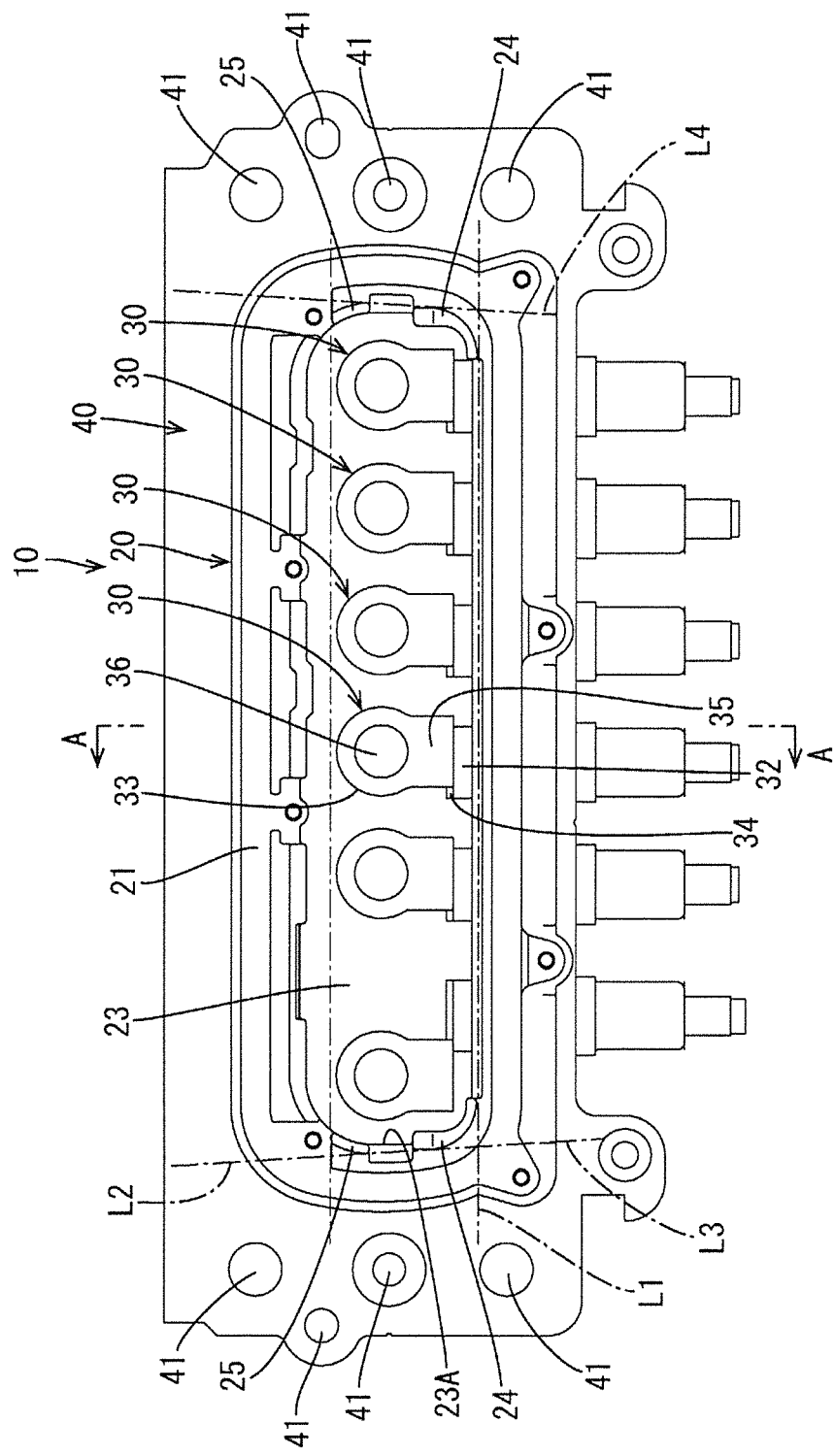
FIG. 2 is a bottom view of the connector.
Figure 3:
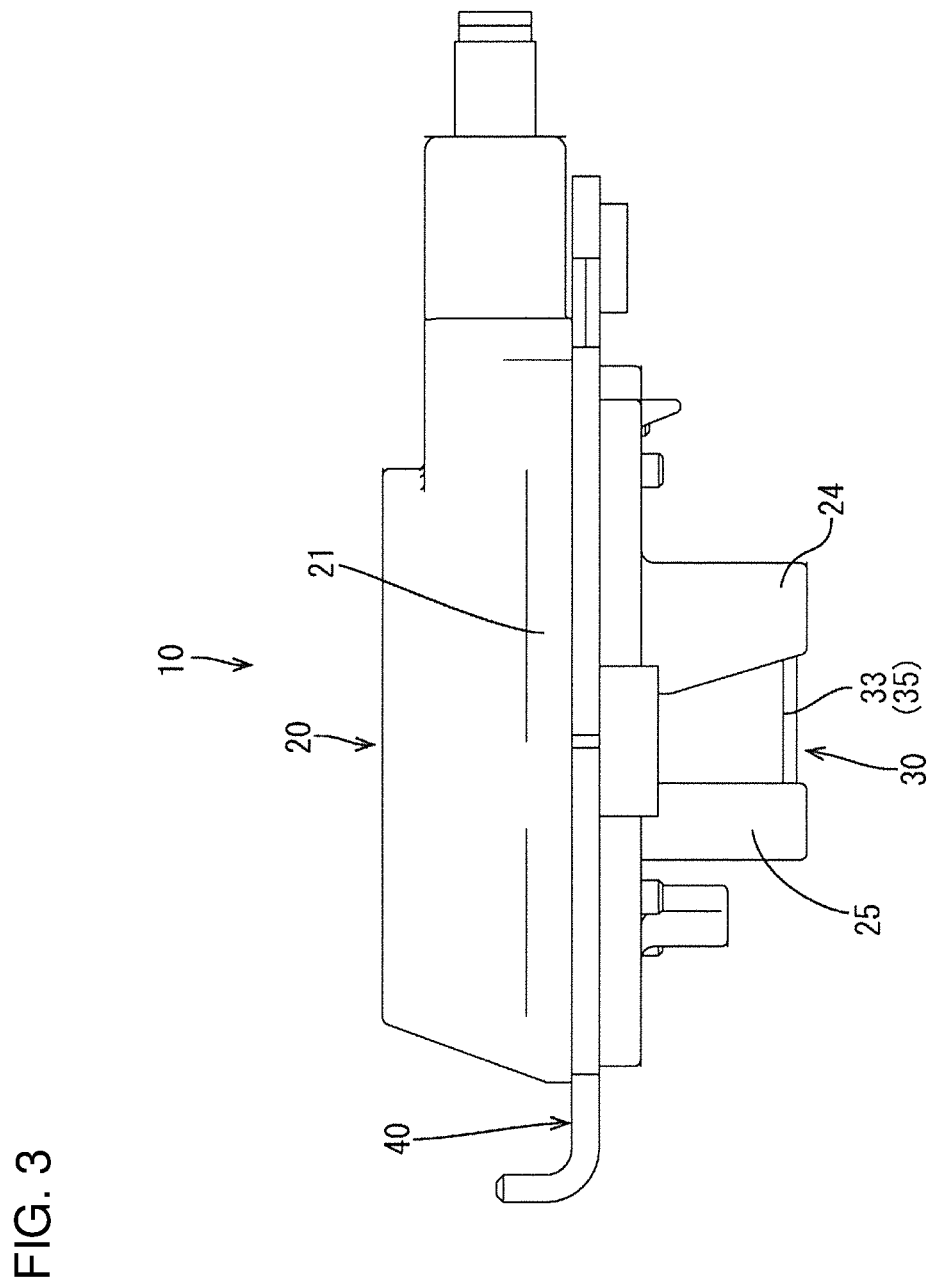
FIG. 3 is a side view of the connector.

An embodiment is described with reference to FIGS. 1 to 4. A connector 10 in this embodiment includes, as shown in FIGS. 1 and 2, a housing 20 made of synthetic resin, terminals 30 held in the housing 20 and a metal plate 40 for mounting the housing 20 on a device, such as a motor. As shown in FIG. 1, the housing 20 includes a body 21 integrally holding the metal plate 40 and left and right protection walls 22 projecting down from the lower surface of the body 21. As shown in FIG. 2, a wide work hole 23 penetrates through the body 21.

Figure 4:
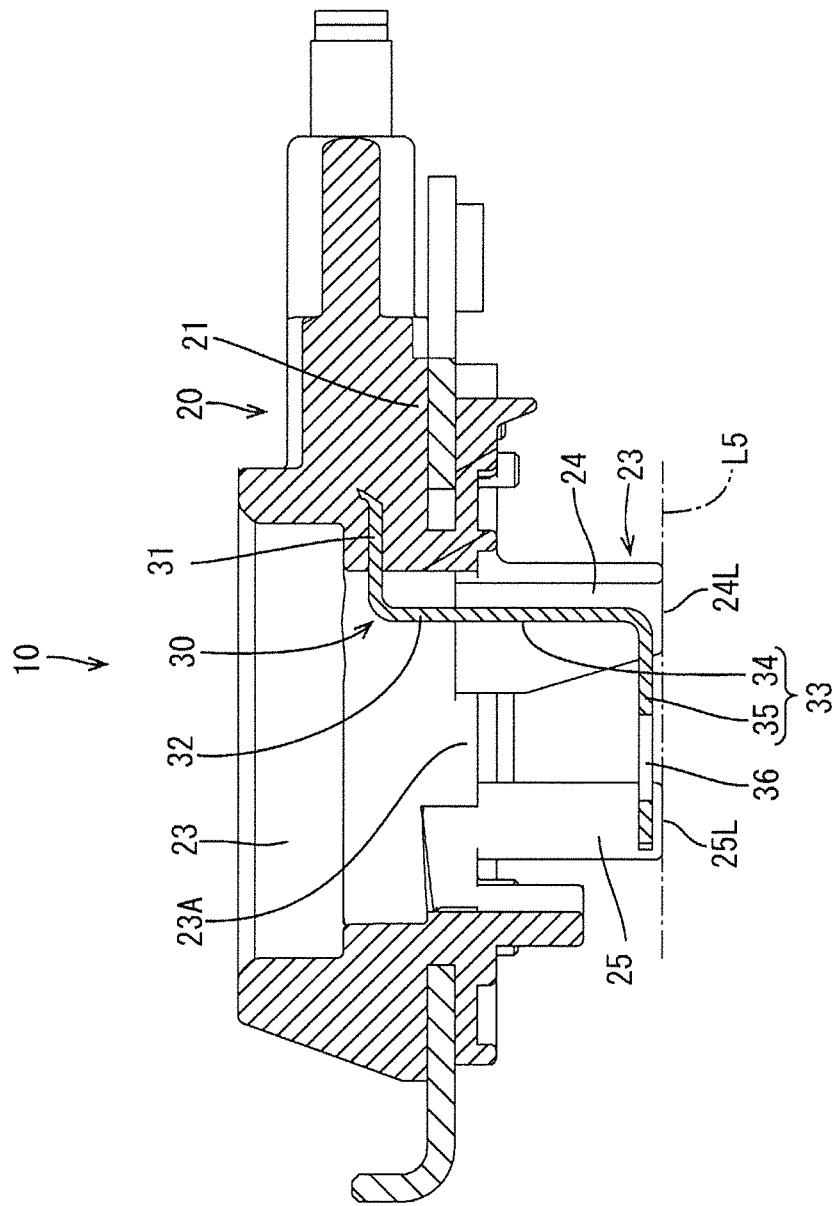
FIG. 4 is a section along A-A in FIG. 2.

As shown in FIG. 2, the terminals 30 face in a vertical direction and provided side by side in the lateral direction in the work hole 23. As shown in FIG. 4, each terminal 30 is formed into a substantially crank shape by press-working a conductive metal plate. Each terminal 30 includes an embedded portion embedded in the housing 20, an internal connecting portion 32 connected to the embedded portion 31 and disposed inside the work hole 23 and an external connecting portion 33 connected to the internal connecting portion 32 and disposed outside the work hole 23 (in a lower space communicating with the work hole 23). As shown in FIG. 4, the external connecting portion 33 is composed of a vertical portion 34 connected to the internal connecting portion 32 and extending in the vertical direction and a horizontal portion 35 connected to the vertical portion 34 and extending in a horizontal direction. A bolt hole 36 penetrates through the horizontal portion 35 in the vertical direction. As shown in FIG. 2, the horizontal portion 35 extends in a longitudinal direction perpendicular to the lateral direction.

The plate 40 is held to protrude laterally from an outer peripheral side surface of the body 21. As shown in FIG. 2, the plate 40 is long in the lateral direction and has a substantially rectangular shape similar to the work hole 23. Holes 41 penetrate through the plate 40 at both left and right sides of the body 21. Further, as shown in FIG. 4, the plate 40 is disposed on a lower side of the body 21.

Each protection wall 22 provided on the body 21 of the housing 20 includes a first protection wall 24 disposed on the right side in FIG. 4 in the longitudinal direction and a second protection wall 25 disposed on the left side shown in FIG. 4 in the longitudinal direction. Both the first and second protection walls 24, 25 project down from an edge 23A of the work hole 23. As shown in FIG. 2, the first protection walls 24 are disposed laterally to base end sides of the horizontal portions 35 located on both left and right sides, and the second protection walls 25 are disposed laterally to tip sides of the horizontal portions 35 located on the both left and right sides.

Specifically, the protection walls 22 are composed of left and right first protection walls 24 and a pair of left and right second protection walls 25, and the horizontal portions 35 are located inside an area enclosed by these protection walls 24, 25. More specifically, all the horizontal portions 35 are located inside an area enclosed by a tangent L1 circumscribing the pair of left and right first protection walls 24, a tangent L2 circumscribing the pair of left and right second protection walls 25, a tangent L3 circumscribing the first and second protection walls 24, 25 on the shown left side and a tangent L4 circumscribing the first and second protection walls 24, 25 on the shown right side.

Further, as shown in FIG. 4, the horizontal portion 35 is disposed at a position more distant from the body 21 than the external connecting portion 33 in a penetration direction of the work hole 23 and, in other words, located above a lower end 24 of the first protection wall 24 and above a lower end 25L of the second protection wall 25. Specifically, all the horizontal portions 35 are located in an area above a tangent L5 circumscribing the lower end 24L of the first protection wall 24 and the lower end 25L of the second protection wall 25. Thus, if the connector 10 is dropped by mistake, either the lower end 24L of the first protection wall 24 or the lower end 25L of the second protection wall 25 first collides with a ground surface. Even if the lower ends 24L, 25L of all the protection walls 24, 25 contact the ground surface, the horizontal portions 35 do not contact the ground surface.

As described above, the protection walls 22 collide with the ground surface earlier than the external connecting portions 33 if the connector 10 is dropped by mistake. Thus, the external connecting portions 33 cannot be damaged. Further, the protection walls 22 are disposed at both sides of the external connecting portions 33 in the lateral direction. Thus, the external connecting portions 33 located on the both sides in the lateral direction also can be protected by the protection walls 22.

The external connecting portion 33 may be composed of the vertical portion 34 connected to the internal connecting portion 32 and the horizontal portion 35 connected to the vertical portion 34, and the protection wall 22 may include the first protection wall 24 disposed on one side in the longitudinal direction perpendicular to the lateral direction and the second protection wall 25 disposed on the other side in the longitudinal direction. Accordingly, one side of the horizontal portion 35 can be protected by the first protection wall 24 and the other side of the horizontal portion 35 can be protected by the second protection wall 25.

The protection walls 22 may project from the edge 23A of the work hole 23 in the body 21 in the penetration direction of the work hole 23. According to this configuration, the protection walls 22 do not enlarge the connector 10.

The invention is not limited to the above described and illustrated embodiment. For example, the following modes also are included.

Although the first protection wall 24 and the second protection wall 25 are formed separately in the above embodiment, first and second protection walls may be integral.

Although the protection walls 22 are provided on the edge 23A of the work hole 23 in the above embodiment, protection walls may be provided at a location other than the edge 23A of the work hole 23. The positions of the protection walls do not matter as long as the protection walls are located on the lower surface of the body 21.

LIST OF REFERENCE SIGNS

10 . . . connector
20 . . . housing
21 . . . body
22 . . . protection wall
23 . . . work hole
23A . . . hole edge part
24 . . . first protection wall
25 . . . second protection wall
30 . . . terminal
31 . . . embedded portion
32 . . . internal connecting portion
33 . . . external connecting portion
34 . . . vertical portion
35 . . . horizontal portion

What is claimed is:

1. A connector, comprising:
a housing including a body and a work hole penetrating through the body, the work hole having opposite first and second ends spaced apart in an arranging direction and opposite first and second sides extending between the first and second ends;
terminals held in the housing and arranged in the arranging direction, each of the terminals including an embedded portion embedded in the housing, an internal connecting portion connected to the embedded portion and disposed inside the work hole and an external connecting portion disposed outside the work hole, the external connecting portion including a vertical portion connected to the internal connecting portion and a horizontal portion connected to the vertical portion;
first and second pairs of protection walls projecting from the body at positions in proximity to the opposite first and second ends of the work hole, each of the pairs of protection walls including first and second protection walls projecting individually from the body, the first protection wall in each of the pairs being in proximity to the first side of the work hole and the second protection wall in each pair being spaced from the first side of the work hole.

2. The connector of claim 1, wherein the horizontal portion of each of the plurality of terminals includes a base end adjacent the vertical portion of the respective terminal and a tip remote from the vertical portion, the base ends of the horizontal portions being between the first protection walls in the arrangement direction and the tips of the horizontal portions being between the second protection walls in the arrangement direction.

3. The connector of claim 1, wherein projecting distances of the protection walls from the body exceed projecting distances of the external projecting portions of the terminals from the body.

4. The connector of claim 3, wherein the horizontal portions of the terminals are inside an area surrounded by the protection walls.

5. The connector of claim 1, wherein projecting directions of the protection walls from the body of the housing are substantially parallel to projecting directions of the vertical portions of the terminals.

6. The connector of claim 1, wherein the protection walls project from the body at positions substantially adjacent the work hole.

7. The connector of claim 6, wherein the work hole penetrates through the body of the housing in a penetration direction, and wherein the protection walls project from the body in projecting directions that are substantially parallel to the penetration direction of the work hole.

\* \* \* \* \*